3,364,995
HYDRAULIC FRACTURING FLUID-BEARING
EARTH FORMATIONS
Bobby L. Atkins, Lake Jackson, Tex., and Edwin N. Alderman, Jr., Tulsa, Okla., assignors to The Dow Chemical Company, Midland, Mich., a corporation of Delaware
No Drawing. Filed Feb. 14, 1966, Ser. No. 527,095
10 Claims. (Cl. 166—38)

ABSTRACT OF THE DISCLOSURE

Fluid flow through fractures created in a formation is improved by placing in the fractures a mixture comprising: (1) substantially water-insoluble, oil-insoluble granules and (2) a selected solid spacer material which chemically decomposes in situ, to provide a discontinuous monolayer (that is a layer about one particle thick) to provide spacing among the granules comprising the one particle thick tier. It is recommended that the average particle size of the granules employed be substantially the same as that of the spacer material. Spacer materials to be employed are inorganic carbonates, organic polysulfones, or carbides which are required to be injected in the absence of water but which must contact water after injection or an ammonium salt and a water-soluble hydroxide which must be injected in successive steps. The granules may be such material as sand, ground nut shell, glass bead, aluminum pellet, resin pellets, or the like. The carrier employed for said mixture may be water, brine, or oil so long as it is compatible with the material being injected.

---

The invention pertains to hydraulic fracturing of earthen formations, i.e. treatment by injecting a fluid down a wellbore penetrating the formation at pressures sufficiently high to crack and to create cleavages and fractures in the formation, and particularly pertains to hydraulic fracturing employing substantially water-insoluble and oil-insoluble particulate material suspended in the fluid for the purpose of propping open the fractures created, to which reference is sometimes made hereinafter as a proppant or sometimes merely as a prop.

To attain the best benefits from hydraulic fracturing, it is known that the propping materials employed must have specific characteristics so that they can be deposited in the reservoir rock cleavages or fractures which are created, before the natural formation forces can reassert themselves sufficiently to close the fractures. A flintstone sand, of which certain sands in the vicinity of Ottawa, Ill., is illustrative of a widely used satisfactory proppant.

Propping sands used in conventional fracturing have a particle size range between about 20 and about 100 mesh (U.S. Bureau of Standards, Standard Sieve Series). Such sands having a particle size range between about 20 and 60 mesh are most commonly employed in conventional fracturing operations. Satisfactory control of the deposition of the particulate propping agent in the fractures, although (when attained) known to contribute extensively to the efficacy of the fracturing job, has been hard to attain.

A completely satisfactory method of obtaining this desired control of the condition in which the propping agent is emplaced in the fractures created has heretofore not been known. Attempts have been made which have shown some extent of control of such deposition but a need for more effective control of the deposition of the propping agent continues to exist.

Superior fracturing jobs are now known to be accomplished by emplacing the propping agent in a relatively thin layer, preferably a monolayer, on the face of the exposed reservoir rock along the fractures and maintaining interspaces among the propping agent, to provide an improved monolayer to which reference is sometimes made as a partial monolayer or preferably a discontinuous monolayer, thereby to insure good permeability to fluid flow. The concept of a monolayer in fractures is relatively recent.

A description and process for use in attempting to attain a monolayer by selection of relatively large particles of proppant, are described in U.S. Patent 3,121,464 issued Feb. 18, 1964, e.g. column 1, line 47 to column 2, line 4. According to conventional practice, prior to said patent, the propping agent was packed in rather large amounts to provide relatively thick layers in a fracture and, as a result, the porosity thereof, in comparison to a discontinuous monolayer, was low and, consequently, the permeability to fluid flow therethrough somewhat impaired. The use of oil-soluble spacer materials has recently been suggested, such use being described in Oil and Gas Journal, pages 97 to 99, of Sept. 27, 1965.

However, in any heretofore known method of providing a discontinuous monolayer prop in fractures, the spacing has been attempted to be provided either by the selection of specific large size proppant particles or by use of an oil-soluble spacer. Disadvantages of such practice usually include an undesirably long period of time between injection of the spacer-proppant and dissolution of the spacer material, because the rate of dissolution is slow and/or a large amount of solvent liquid is required and, accordingly, much time must be allowed for it to be produced or injected.

The present invention provides improved fluid flow along and through fractures created in an earthen formation by emplacing in the fractures created a mixture of (1) substantially water-insoluble, oil-insoluble, granules and (2) a selected solid spacer material, which chemically decomposes in situ to provide a discontinuous monolayer (i.e. about a one-particle thick tier or layer of particles) which assures spacing among the particles comprising the one-particle thick tier. There results a propped-open fracture of a thickness of substantially the diameter of the proppant particles. The size of the proppant and spacer particles employed usually are suggested to be such that all are sufficiently fine to pass through a No. 4 mesh sieve but too coarse to pass through a No. 80 mesh sieve. Particle sizes identified by a number greater than 40, i.e. of the finer sizes falling within the suggested range are usually not employed. The size of particles of both propping and spacer materials for use in the invention are preferred to be between about 6 and about 20 mesh. Preferably the particle size is graded so as to fall within one of the following relatively narrow ranges: 8 to 12; 10 to 20; 12 to 20; or 20 to 40 mesh. It is recommended that the average particle size of the propping agent employed be substantially the same as that of the spacer material.

The spacer materials required to be used in the practice of the invention are inorganic carbonates or organic polysulfones which may be injected in either oil- or water-base liquids, or carbides which are required to be injected in the absence of water but which must contact water after injection, or an ammonium salt and a water-soluble hydroxide which must be injected in successive steps so that contact with each other occurs in the fractures.

A metal carbonate, when employed, is contacted in the formation by an acidic medium wherein hydrogen atoms replace the metal atoms of the carbonate to yield carbonic acid which decomposes promptly to $CO_2$ gas and water.

Illustrative of organic polysulfones to employ in the practice of the invention are:

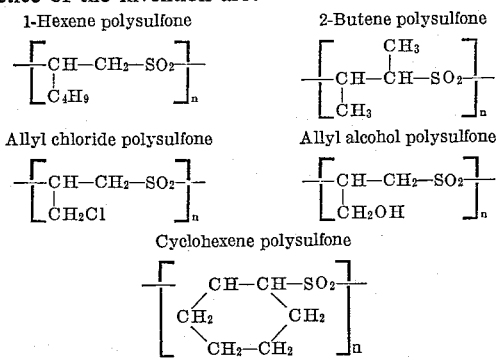

Cyclohexene polysulfone $$\left[\begin{array}{c} CH-CH-SO_2 \\ CH_2 \quad\quad CH_2 \\ CH_2-CH_2 \end{array}\right]_n$$

wherein $n$ is 10 to 10,000.

Other unsaturated monomers which are copolymerizable with $SO_2$ to produce a polysulfone that is thermally unstable at temperatures encountered in subterranean formations being treated may be used. For example, olefins having from 2 to 22 carbon atoms have been reacted with $SO_2$ to prepare polysulfones found useful in the practice of the invention. Other polysulfones employed satisfactorily are diallylcarbonate polysulfone, styrene polysulfone, and allyl cyclohexanepropionate polysulfone.

For determination of polysulfones having the desired properties for use in the invention, reference is suggested to High Polymers, vol. XIII by Gaylord, under Polyethers, Part III, entitled, "Polyalkylene Sulfides and Other Polythioethers (Sulfones)," especially pages 225 to 270. Methods of preparation as well as such properties as predictable thermal decomposition temperatures based upon thermodynamic considerations are set forth therein.

Methods of preparing polysulfones are also described in Sulfur Bonding by Charles C. Price and Shigerce Oae, published by The Ronald Press Company, New York (1962). Broadly, as described therein, sulfur dioxide is reacted with an alkene (olefin) or derivative thereof which has retained the terminal double bond, e.g. allyl alcohol, an allyl halide or diallyl ether (which may be designated substituted alkenes). The polysulfone employed as the spacer material in fracturing decomposes at the temperature of the formation yielding the alkene or derivative thereof employed in the preparation and $SO_2$. The polysulfones, regardless of their molecular weight, are thermally unstable, and the temperature above which these polymers are unstable is dependent upon the particlular alkene or substituted alkene comonomer which is polymerized with the sulfur dioxide. The following table lists a number of monomeric alkenes and substituted alkenes together with temperatures above which the polysulfones made by reacting it with $SO_2$ will be thermally unstable. Thus, by choosing the proper monomer, one can make a polymer useful as a spacer material to suit the conditions encountered in the formation being fractured.

The table below sets out certain monomeric alkenes and derivatives thereof, together with the decomposition temperature of the sulfone made by reacting it with $SO_2$.

| Monomer: | Decomposition temperature in ° C. |
|---|---|
| Ethylene | 95 |
| Propylene | 90 |
| 1 - butene | 65 |
| 2 - butene | 40 |
| Isobutene | 5 |
| 1 - pentene | 45 |
| 1 - hexene | 60 |
| Cyclohexene | 26 |
| 1 - hexadecene | 50 |
| Allyl alcohol | 66 |
| Allyl chloride | 80 |
| Diallyl ether | 85 |

In the case of isobutene the fracturing liquid would be used only in colder climates or would require cooling during injection.

The alkene or derivative thereof and $SO_2$ formed by the thermal decomposition in the formation are readily removed from the fractures, as by pumping or flushing, either by an injected fluid or by the formation fluid subsequently produced.

A carbide useful in an embodiment of the invention may be illustrated by $CaC_2$ which, when injected into place via a non-aqueous carrier and subsequently contacted by water, reacts therewith to produce acetylene and $Ca(OH)_2$ according to the equation:

$$CaC_2 + 2H_2O \rightarrow Ca(OH)_2 + C_2H_2\uparrow$$

The acetylene being a gas and the $Ca(OH)_2$ being readily carried away in water are both readily removed.

An ammonium salt and a water-soluble hydroxide, useful in the practice of a further embodiment of the invention are injected into place in successive steps, either or preferably both being injected with the selected propping agent. Usually an oil-base carrier liquid is employed followed by injecting water which subsequently contacts the salt and hydroxide thereby providing ionic contact and reacting according to the equation below:

$$2NH_4Cl + Ca(OH)_2 \rightarrow CaCl_2 + 2NH_3\uparrow + 2H_2O$$

The $CaCl_2$ so formed, being highly water-soluble, readily dissolves in the water or in any aqueous liquid which contacts it. The $NH_3$, as a gas, aids in flushing out the well.

Illustrative of propping agents to employ are sand, ground nutshell, glass beads, aluminum pellets, resin pellets, and the like. As aforesaid, any water-insoluble and oil-insoluble material having suitable particle size is acceptable for the practice of the invention. The preferred propping agent is glass beads which are relatively coarse and of limited size range, e.g. 8 to 20 mesh, and more desirably, 8 to 12 mesh.

The fracturing fluid may be water, brine, crude oil, residium, fractionated or cracked derivatives of crude oil, e.g. gas oil, Diesel oil, naphtha, kerosene, and the like with the exception that such reactive mixtures as water with either a carbide or mixtures of certain salts and hydroxides must be avoided. Gases such as $CO_2$ or $N_2$ may be dissolved or dispersed in the fracturing liquid, if desired. Best results are obtained when the injection rate of fracturing liquid is relatively high which facilitates the formation of the monolayer.

It is recommended that a fluid-loss control agent known to be useful to lessen loss of fluid to the formation be used in the practice of the invention. Illustrative of such agents for use in aqueous-base drilling fluids is silica flour (very finely subdivided silica) in combination with a dispersing gum and illustrative of one to be used in an oil-base fracturing liquid is the composition described in the Brown and Landers Patent No. 2,779,935.

Agents which reduce turbulence in liquids being pumped and lessen pumping costs as well as permit higher rates of injection (sometimes called friction-loss additives) may also be added. The use of such additives in the practice of the invention is encouraged since such higher rates of injection are found to give best results.

The invention is practiced by admixing a propping agent and spacer, as above described, with or without additional additives such as fluid-loss control agents or friction-loss agents with any one of an aqueous base, oil base, or emulsion-type fracturing liquid, with which it is not immediately reactive, in such concentration as to result in a fracturing fluid of suitable consistency and composition, and forcing the resulting composition into the formation at pressures which fracture the formation and deposit a heterogenous monolayer of propping agent and spacer, whereupon the spacer component undergoes subsequent change, e.g. decomposes, dissolves, or melts and is removed, leaving the discontinuous monolayer of particulate propping agent.

The amount of propping agent employed may be anywhere from about 0.05 pound to as much as about 6 pounds thereof per gallon of the fracturing liquid, preferably between about 0.1 and 3.0 pounds per gallon. The amount of propping agent employed in a specific fracturing job is such as will provide a discontinuous monolayer or film of about the thickness of the particle diameters in the fractures created. The pressures applied are such as to create fractures but in such a way as not to result in fractures of undesirably large cross-section.

The amount of the spacer compound to employ varies considerably, dependent upon the spacer composition employed and the nature of the formation being fractured. It should be employed in an amount sufficient to provide at least about half and preferably at least equal to the volume of the propping agent employed. It is recommended that there be an excess of the spacer material over the propping agent. Since amounts by weight are usually more conveniently calculated, it is suggested that amount of spacer material employed be between about 1 and about 10 times the weight of the propping agent employed. The usual weight ratio of spacer to propping agent is between about 2 and 4.

The following examples show the efficacy of the practice of the invention.

EXAMPLE 1

A flintstone sand having a mesh size largely between about 10 and 20, a polysulfone having an average molecular weight of about 5,000 and water containing silica flour as a fluid-loss agent are blended and injected down a borehole penetrating a subterranean formation to be fractured (having a temperature above the decomposition temperature of the polysulfone), in an amount of each sufficient to provide about 1 pound of sand and about 3 pounds of the polysulfone per gallon of water. The rate of injection is sufficient to fracture the formation as indicated by a leveling off or drop in surface pressure on the injected fluid without prior decrease in injection rate. There is thus deposited a monolayer of sand and polysulfone in the newly created fractures. Due to the heat of the formation, the polysulfones decompose and the components removed leaving a discontinuous monolayer of the sand having high fluid permeability. The fracturing fluid is then substantially removed from the borehole. This can be done by putting the well back in production and segregating the first fluid produced.

EXAMPLE 2

A well, having a bottom hole temperature of 175° F. and an effective overburden pressure of 4,000 p.s.i. was treated with 10,000 gallons of gelled crude oil injected at a rate of 25 barrels per minute. A total of 10,000 pounds of proppant-spacer blend, consisting of 2,500 pounds of 12 to 20 mesh rounded walnut shell proppant and 7,500 pounds of 12 to 20 mesh ammonium carbonate spacer in a concentration of 1 pound of proppant-spacer per gallon of gelled crude oil was employed.

The amount of proppant-spacer blend was calculated to be just sufficient to provide a monolayer containing about 240 pounds/1000 ft.² of created fracture area. After deposition in the fractures, ammonium carbonate decomposes by heat (the decomposition temperature being about 150° F.) according to the equation:

$$(NH_4)_2CO_3 \rightarrow CO_2\uparrow + H_2O + 2NH_3\uparrow$$

The decomposition products are readily removed. There would then remain a partial or discontinuous monolayer consisting of about 60 pounds of proppant per 1000 ft.² of fracture area. Under these well conditions the fracture conductivity should be approximately 11 Darcy feet. A packed fracture of 10 to 20 mesh sand under these same conditions would have a conductivity of 2.1 Darcy feet at a concentration of 850 pounds per 1000 ft.² of fracture area.

There was thereby achieved a better than a fivefold increase in fracture conductivity by the method of the invention.

Reference to the examples shows the marked improvement in permeability of an effective fracture performed according to the invention over conventional fracturing.

Having described our invention what we claim and desire to protect by Letters Patent is:

1. In a method of fracturing an earthen formation wherein a fracturing liquid containing a substantially water-insoluble oil-insoluble particulate propping agent in suspension therein is injected at greater than fracturing pressures into the formation and at least a portion of the propping agent is deposited in newly created fractures, the improvement which comprises injecting with said fracturing fluid and propping agent a particulate spacer material chemically unreactive with said fluid and thermally decomposable at the temperature of the formation, said spacer material being selected from the class consisting of carbonates, polysulfones, anhydrous carbides which are subsequently brought into contact with water in the newly created fractures, and separate injections of an inorganic ammonium salt and a water-soluble hydroxide, which are brought into contact with each other in newly created fractures, the amount of said spacer composition employed, being not less than about half the volume of the propping agent present.

2. The method according to claim 1 wherein the particulate propping agent is glass beads having a mesh size such that it all would substantially pass through a No. 4 mesh screen but substantially all be retained on a No. 40 mesh screen.

3. The method according to claim 1 wherein the particulate propping agent is sand of a size such that substantially all would pass through a No. 4 mesh screen but substantially all would be retained on a No. 40 mesh screen.

4. The method according to claim 1 wherein the particulate propping agent is ground nut shell of a size that substantially all would pass through a 8 mesh screen and substantially all would be retained on a 20 mesh screen.

5. The method according to claim 1 wherein the propping agent is employed in an amount of between about 0.05 and 6 pounds per gallon of fracturing liquid.

6. The method according to claim 1 wherein the spacer material is employed in an amount of between about 1 and 10 times the weight of the propping agent.

7. The method according to claim 1 wherein the spacer material is a polysulfone.

8. The method according to claim 1 wherein the spacer material is a carbonate.

9. The method according to claim 1 wherein the spacer material is $CaC_2$ which, after injection, is contacted with water.

10. The method according to claim 1 wherein the spacer material consists of an ammonium salt and a water-soluble hydroxide which are independently injected into the fractures being created, at least one of which is injected with at least some of said propping agent.

References Cited

UNITED STATES PATENTS

| | | | |
|---|---|---|---|
| 3,164,208 | 1/1965 | McGuire et al. | 166—42 |
| 3,173,484 | 3/1965 | Huitt et al. | 166—42 X |
| 3,195,635 | 7/1965 | Fast | 166—42 |
| 3,217,801 | 11/1965 | Fast et al. | 166—42 |
| 3,237,693 | 3/1966 | Huitt et al. | 166—42 |
| 3,259,190 | 7/1966 | Parsons | 166—42 |
| 3,266,573 | 8/1966 | Rixe | 166—42 |
| 3,302,719 | 2/1967 | Fischer | 166—42 |
| 3,316,965 | 5/1967 | Watanabe | 166—42 X |

STEPHEN J. NOVOSAD, *Primary Examiner.*